United States Patent
Masuda et al.

(10) Patent No.: US 7,354,654 B2
(45) Date of Patent: Apr. 8, 2008

(54) THERMOPLASTIC POLYMER COMPOSITION, MOLDED PRODUCT, AND MULTILAYER STRUCTURE

(75) Inventors: Haruhisa Masuda, Ibaraki (JP); Hiromichi Nakata, Ibaraki (JP); Eiji Nakamura, Ibaraki (JP); Toshiyuki Zento, Ibaraki (JP); Isamu Okamoto, Ibaraki (JP); Motohiro Fukuda, Ibaraki (JP)

(73) Assignee: Kuraray Co., Ltd, Kurashiki-shi (JP)

( * ) Notice: Subject to any disclaimer, the term of this patent is extended or adjusted under 35 U.S.C. 154(b) by 339 days.

(21) Appl. No.: 10/728,991

(22) Filed: Dec. 8, 2003

(65) Prior Publication Data
US 2004/0204530 A1 Oct. 14, 2004

(30) Foreign Application Priority Data
Dec. 12, 2002 (JP) .............................. 2002-360377
Jul. 9, 2003 (JP) .............................. 2003-272372

(51) Int. Cl.
*C08L 53/02* (2006.01)
(52) U.S. Cl. ...................... 428/515; 428/516; 428/517; 525/57
(58) Field of Classification Search ................. 524/505, 524/503; 525/57; 428/515, 516, 517
See application file for complete search history.

(56) References Cited

U.S. PATENT DOCUMENTS

| 4,429,076 A | | 1/1984 | Saito et al. | |
|---|---|---|---|---|
| 5,229,456 A | * | 7/1993 | Ilenda et al. .................. | 525/66 |
| 5,332,784 A | * | 7/1994 | Shiraki et al. ................. | 525/98 |
| 5,621,045 A | * | 4/1997 | Patel et al. ................... | 525/237 |
| 5,700,412 A | * | 12/1997 | Mehra et al. ................ | 264/143 |
| 5,965,627 A | * | 10/1999 | Allcock et al. ............. | 521/137 |
| 6,841,618 B2 | * | 1/2005 | Masuda ........................ | 525/57 |
| 2002/0160137 A1 | | 10/2002 | Varma | |
| 2003/0018114 A1 | * | 1/2003 | Tai et al. ..................... | 524/413 |
| 2003/0162897 A1 | * | 8/2003 | Masuda ........................ | 525/88 |

FOREIGN PATENT DOCUMENTS

| EP | 0 814 126 | 12/1997 |
|---|---|---|
| EP | 0 853 096 | 7/1998 |
| EP | 1 086 991 | 3/2001 |
| EP | 1 197 520 | 4/2002 |
| EP | 1 203 790 | 5/2002 |
| EP | 1 338 621 | 8/2003 |
| JP | 1-313552 | 12/1989 |
| JP | 01-315442 | 12/1989 |
| JP | 03-277642 | 12/1991 |
| JP | 04-292647 | 10/1992 |
| JP | 7-207097 | 8/1995 |
| JP | 08-081601 | 3/1996 |
| JP | 08-085570 | 4/1996 |
| JP | 2612034 | 2/1997 |
| JP | 10-110086 | 4/1998 |
| JP | 2002-036448 | 2/2002 |
| JP | 2002-060500 | 2/2002 |
| JP | 2002-146142 | 5/2002 |
| JP | 2002-146217 | 5/2002 |
| JP | 2002-241619 | 8/2002 |
| JP | 2003-238758 | 8/2003 |
| WO | WO 02/064677 | 8/2002 |

OTHER PUBLICATIONS

Hibi, STN AN 1993:170753, abstracting JP 04292647, Jan. 5, 1993.*
Nakamura et al., electronic translation of JP 2002-060500, Feb. 26, 2002.*
U.S. Appl. No. 10/369,503, filed Feb. 21, 2003, Masuda.
U.S. Appl. No. 10/728,991, filed Dec. 8, 2003, Masuda et al.

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

A thermoplastic polymer composition having good flexibility and excellent barrier properties with respect to gases and organic liquids, which can be adhesively bonded to a polyolefin resin, this composition comprising an ethylene-vinyl alcohol copolymer (A), a polymer mixture (B) composed of a block copolymer (I) mainly comprising a vinyl aromatic polymer block and a conjugated diene polymer block which may be hydrogenated, and a rubber softener (II), and a polyolefin resin (C), wherein at least part of the block copolymer (I) is modified at a modification ratio of 0.05 wt. % or higher so as to have a functional group capable of reacting with the ethylene-vinyl alcohol copolymer (A), wherein the ISO type A hardness of the thermoplastic polymer composition is not less than 30 and not higher than 90, and the oxygen permeation coefficient is 20,000 mL·20 μm/m²·day·atm or less.

12 Claims, No Drawings

THERMOPLASTIC POLYMER COMPOSITION, MOLDED PRODUCT, AND MULTILAYER STRUCTURE

BACKGROUND OF THE INVENTION

1. Field of the Invention

The present invention relates to a thermoplastic polymer composition having good flexibility and excellent barrier properties with respect to gases and organic liquids and suitable for adhesive bonding to polyolefin resins. The present invention also relates to a molded product composed of such a thermoplastic polymer composition and to a multilayer structure having a layer composed of such a thermoplastic polymer composition.

2. Description of the Related Art

In recent years, thermoplastic elastomers which are soft materials having rubber elasticity, require no vulcanization, and can be molded and recycled similarly to thermoplastic resins have been widely used in the fields of automobile parts, parts of electric appliances, electric cable coatings, medical components, consumer goods, footwear, and the like. Among such thermoplastic elastomers, the usage of hydrogenates of vinyl aromatic compound—conjugated diene compound block copolymers (referred to hereinbelow simply as "hydrogenated block copolymers") has recently increased because blending a softening agent for rubber therewith increases the flexibility thereof and gives excellent rubber elasticity and moldability thereto.

However, thermoplastic elastomers such as the aforesaid hydrogenated block copolymers generally have poor barrier properties with respect to gases such as oxygen, nitrogen, and carbon dioxide, and organic liquids such as gasoline and oils. Accordingly, they are very difficult to use for sheets, films, packaging materials for food, containers, packing materials for containers, tubes, hoses, and the like, which require barrier properties with respect to such gases and organic liquids.

On the other hand, ethylene-vinyl alcohol copolymers have good barrier properties with respect to gases and organic liquids and do not generate toxic gases during incineration, as vinylidene chloride resins or vinyl chloride resins. As a result, they are widely used for a variety of applications, e.g., for packaging materials for food. However, because ethylene-vinyl alcohol copolymers have poor flexibility, they are not suitable for applications where thermoplastic elastomers have been used and where barrier properties are required.

Accordingly, an attempt has been made to obtain a material combining flexibility and barrier properties with respect to gases and organic liquids by mixing an ethylene-vinyl alcohol copolymer with another soft resin under melting conditions (Japanese Patent Application Laid-open No. H10-110086). However, due to poor mutual compatibility of ethylene-vinyl alcohol copolymer and soft resins, the product has poor mechanical properties. Yet another drawback thereof is that the product does not adhere to polyolefin resins. Furthermore, an attempt has also been made to obtain a material with excellent impact resistance and oil resistance by mixing ethylene-vinyl alcohol copolymer with a soft resin under melting conditions, wherein the soft resin was modified with an epoxy compound, in order to improve mutual compatibility of the ethylene-vinyl alcohol copolymer and the soft resin (Japanese Patent Application Laid-open No. H7-207097).

However, flexibility and adhesion to polyolefin resins was insufficient. Furthermore, it was also suggested to add a styrene-based elastomer modified with maleic anhydride for the purpose of improving mutual compatibility of ethylene-vinyl alcohol copolymer and polypropylene and improving the external appearance of the molded product (Japanese Patent No. 2612034). In this case, adherence to polyolefins is obtained, but the product is hard and demonstrates no rubber elasticity. As a result, it cannot be used as a thermoplastic elastomer.

SUMMARY OF THE INVENTION

It is an object of the present invention to provide a thermoplastic polymer composition which is flexible, has barrier properties with respect to gases and organic liquids, and is adherent to polyolefin resins. Another object is to provide a molded product composed of such a thermoplastic polymer composition and a multilayer structure having a layer composed of such a thermoplastic polymer composition.

The results of the comprehensive study conducted by the inventors demonstrated that a thermoplastic polymer composition comprising a polymer mixture composed of an ethylene-vinyl alcohol copolymer, a specific block copolymer having part thereof modified, and a softening agent for rubbers has satisfactory flexibility and barrier properties, and adding the prescribed amount of a polyolefin resin to such a thermoplastic polymer composition makes it adherent to polyolefin resins. This finding led to the creation of the present invention.

Thus, the present invention provides a thermoplastic polymer comprising the following components (A), (B), and (C):

ethylene-vinyl alcohol copolymer (A);

a polymer mixture (B) composed of a block copolymer (I) mainly comprising a vinyl aromatic polymer block and a conjugated diene polymer block which may be hydrogenated, and a rubber softener (II); and a polyolefin resin (C), wherein the following three conditions are satisfied:

the ratio of [A]:[B] is in the range of 10:90 to 50:50, the ratio of [I]:[II] is in the range of 30:70 to 90:10, the ratio of ([A]+[B]):[C] is in the range of 100:0 to 100:30, when the blending amount of component (A) in the thermoplastic polymer composition is denoted by [A] parts by weight, the blending amount of component (B) is denoted by [B] parts by weight, the blending amount of component (C) is denoted by [C] parts by weight, the blending amount of block copolymer (I) in component (B) is denoted by [I] parts by weight, and the blending amount of rubber softener (II) therein is denoted by [II] parts by weight, at least part of the block copolymer (I) is modified at a modification ratio of 0.05 wt. % or higher so as to have a functional group capable of reacting with the ethylene-vinyl alcohol copolymer (A), the ISO type A hardness of the composition is not less than 30 and not higher than 90, and the oxygen permeation coefficient is 20,000 mL·20 $\mu$m/m$^2$·day·atm or less.

The aforesaid thermoplastic polymer composition preferably contains 10-60 parts by weight of the rubber softener (II). It is also preferred that the functional group capable of reacting with the ethylene-vinyl alcohol copolymer (A) in the block copolymer (I) is a functional group derived from an $\alpha,\beta$-unsaturated carboxylic acid and/or a derivative thereof. The polyolefin resin (C) is preferably propylene polymer. Furthermore, it is also preferred that the polyolefin resin (C) contain a functional group derived from an α,β-unsaturated carboxylic acid and/or a derivative thereof.

The molded product composed of the aforesaid thermoplastic polymer composition is the preferred embodiment of the present invention. A multilayer structure comprising a layer composed of the aforesaid thermoplastic polymer composition and a layer composed of the polyolefin resin (C) is also the preferred embodiment of the present invention. It is preferred that in this configuration, the layer composed of the aforesaid thermoplastic polymer composition and the layer composed of the polyolefin resin (C) are directly adhesively bonded to each other. It is also preferred that the polyolefin resin (C) is a propylene polymer. Furthermore, a packing material for a container composed of such a multilayer structure is the preferred embodiment of the present invention.

Because the thermoplastic polymer composition in accordance with the present invention is flexible and has excellent barrier properties with respect to gases and organic liquids, it can be effectively used for sheets, films, packaging materials for food, containers, packing materials for containers, tubes, and hoses requiring such properties. Furthermore, when this composition comprises a polyolefin resin, it can be bonded without using an adhesive in the laminate with such a resin.

DETAILED DESCRIPTION OF THE INVENTION

The thermoplastic polymer composition in accordance with the present invention comprises an ethylene-vinyl alcohol copolymer (A) mainly composed of ethylene units (—CH$_2$CH$_2$—) and vinyl alcohol units (—CH$_2$—CH(OH)—) as components demonstrating good barrier properties with respect to gases and organic liquids.

From the standpoint of good barrier properties with respect to gases and organic liquids and good moldability, the content ratio of ethylene units in the ethylene-vinyl alcohol copolymer (A) is preferably 10-99 mol %, more preferably 20-75 mol %, still more preferably 25-60 mol %.

The ethylene-vinyl alcohol copolymer (A) is typically a saponified ethylene-aliphatic acid vinyl ester copolymer, as will be described hereinbelow. In this case, from the standpoint of good barrier properties and thermal stability of the obtained ethylene-vinyl alcohol copolymer, the degree of saponification of aliphatic acid vinyl ester units is preferably 50 mol % or higher, more preferably 90 mol % or higher, still more preferably 95 mol % or higher, and even more preferably 98% mol % or higher.

From the standpoint of good moldability, the melt flow rate (measured by the method described in ASTM D1238 under the following conditions: temperature 210° C. and load 2.16 kg) of the ethylene-vinyl alcohol copolymer (A) is preferably 0.1 to 100 g/10 min, more preferably 0.5 to 50 g/10 min, still more preferably 1 to 20 g/10 min.

The intrinsic viscosity of the ethylene-vinyl alcohol copolymer (A) in a mixed solvent containing 85 wt. % phenol and 15 wt. % water at a temperature of 30° C. is 0.1-5 dl/g, more preferably 0.2-2 dl/g.

The ethylene-vinyl alcohol copolymer (A) can be manufactured by the usual method. For example, it can be manufactured by obtaining an ethylene-aliphatic acid vinyl ester copolymer by conducting polymerization of monomers mainly composed of ethylene and an aliphatic acid vinyl ester in an organic solvent such as methanol, t-butyl alcohol, and dimethyl sulfoxide under applied pressure by using a radical polymerization initiator such as benzoyl peroxide and azobisisobutyronitrile, and then saponifying the copolymer in the presence of an acidic catalyst or an alkali catalyst. Examples of suitable aliphatic acid vinyl esters include vinyl ester of acetic acid, vinyl ester of propionic acid, vinyl esters of versatic acids, vinyl ester of pivalic acid, vinyl ester of valeric acid, and vinyl ester of capric acid. Among them, the vinyl ester of acetic acid is preferred.

The ethylene-vinyl alcohol copolymer (A) may contain other structural units in addition to the above-described structural units, provided that the amount of those other structural units is small (preferably not more than 10 mol % based on all the structural monomer units). Examples of other structural units include units derived from α-olefins such as propylene, isobutylene, 4-methylpentene-1,1-hexene, and 1-octene, vinyl esters of carboxylic acids such as vinyl ester of acetic acid, vinyl ester of propionic acid, vinyl esters of versatic acids, vinyl ester of pivalic acid, vinyl ester of valeric acid, vinyl ester of capric acid, and vinyl ester of benzoic acid, unsaturated carboxylic acids such as itaconic acid, methacrylic acid, acrylic acid, and maleic anhydride, or derivatives thereof (for example, salts, esters, nitrites, amides, anhydrides, and the like), vinylsilane compounds such as vinyltrimethoxysilane, unsaturated sulfonic acids and salts thereof, and N-methyl pyrrolidone. Furthermore, the ethylene-vinyl alcohol copolymer may be terminated with a functional group such as an alkylthio group.

The ethylene-vinyl alcohol copolymer (A) used in accordance with the present invention may also contain 0.3-40 mol % of the below-described structural unit (1) in addition to the ethylene units and vinyl alcohol units. Using such a modified ethylene-vinyl alcohol copolymer is preferred in terms of obtaining a thermoplastic polymer composition with excellent flexibility.

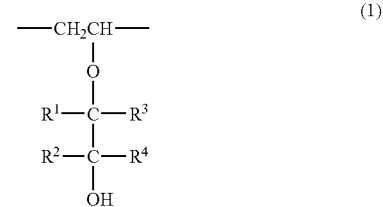

(1)

In the formula, $R^1$, $R^2$, $R^3$, and $R^4$ are independently hydrogen atom, a $C_{1-10}$ aliphatic hydrocarbon group (for example, an alkyl group or an alkenyl group), a $C_{3-10}$ alicyclic hydrocarbon group (for example, a cycloalkyl group or a cycloalkenyl group), a $C_{6-10}$ aromatic hydrocarbon group (for example, phenyl group). $R^1$, $R^2$, $R^3$, and $R^4$ may be the same or different. Furthermore, $R^3$ and $R^4$ may be bonded to each other (the case in which $R^3$ and $R^4$ both represent hydrogen atoms is excluded). Furthermore, when $R^1$, $R^2$, $R^3$, and $R^4$ represent groups other than hydrogen atom, they may be substituted with a substituent such as a hydroxyl group, a carboxyl group, or a halogen atom.

A method for the manufacture of the modified ethylene-vinyl alcohol copolymer comprising the aforesaid structural units (1) has been described in a pamphlet of International Patent Publication No. 02/092643. For example, this modified copolymer can be manufactured by conducting a reaction of an ethylene-vinyl alcohol copolymer with a monovalent epoxy compound with a number-average molecular weight of 500 or less, such as 1,2-epoxybutane, 3,3-epoxybutane, epoxypropane, epoxyethane, and glycidol. Here, the reaction of an ethylene-vinyl alcohol copolymer with a monovalent epoxy compound with a number-average molecular weight of 500 or less can be conducted by any method, for example, by a melt reaction using an extruder or a reaction conducted in a solution.

The thermoplastic polymer composition in accordance with the present invention further comprises a polymer mixture (B) composed of a block copolymer (I) mainly comprising a vinyl aromatic polymer block and a conjugated diene polymer block which may be hydrogenated, and a rubber softener (II). Such a block copolymer (I) has excellent mutual compatibility with polyolefin resins (C), in particular, with polypropylene polymers.

As described hereinbelow, at least part of the block copolymer (I) is modified at a modification ratio of 0.05% or higher, so as to contain a functional group that can react with the ethylene-vinyl alcohol copolymer (A). Here, the modification ratio is defined as a content ratio (wt. %) of functional groups contained in the block copolymer (I). Further, if the modification ratio is too low, then mutual compatibility with the ethylene-vinyl alcohol copolymer (A) is degraded. Therefore, it is preferred that the modification ratio is 0.05 wt. % or higher, more preferably 0.5 wt. % or higher. The modification ratio may be 100%, but if it is too high, mutual compatibility tends to decrease. Therefore, it is preferred that the modification ratio is 20 wt. % or less.

The ratio of the block copolymer, which was subjected to modification (sometimes simply referred to hereinbelow as a modified block copolymer), in the entire block copolymer (I) is preferably 10-80 wt. %, more preferably 25-60 wt. % based on the entire block copolymer (I), because if the ratio of the modified block copolymer is too low, mutual compatibility with the ethylene-vinyl alcohol copolymer (A) degrades, and if this ratio is too high, the cost is increased.

The block copolymer (I) containing no such functional group is less expensive than the modified block copolymer (I) containing the functional group and is preferably used together with the modified block copolymer (I).

In accordance with the present invention, the block copolymer (I) can have a diblock structure represented by a-b, a triblock structure represented by a-b-a or b-a-b, a tetrablock structure represented by a-b-a-b, or a polyblock structure in which five or more a and b blocks are bonded linearly, where a vinyl aromatic polymer block is denoted by a, and a conjugated diene polymer block is denoted by b. Among those structures, the triblock structure represented by a-b-a is preferred because of good flexibility and mechanical properties of the thermoplastic polymer composition obtained with such a structure.

Examples of vinyl aromatic monomers used for forming a vinyl aromatic polymer block which, together with the conjugated diene polymer block, constitutes the block copolymer (I), include styrene, α-methylstyrene, β-methylstyrene, o-methylstyrene, m-methylstyrene, β-methylstyrene, t-butylstyrene, 2,4-dimethylstyrene, 2,4-6-trimethylstyrene, monofluorostyrene, difluorostyrene, monochlorostyrene, dichlorostyrene, methoxystyrene, vinylnaphthalene, vinylanthracene, indene, and acetonaphthylene. The vinyl aromatic polymer block may contain structural units composed of only one of the aforesaid vinyl aromatic compounds, or may have structural units composed of two such compounds or more. Among them, the preferred vinyl aromatic polymer block is preferably mainly composed of structural units derived from styrene.

In addition to the structural units composed of a vinyl aromatic compound, the vinyl aromatic polymer block, if necessary, may contain a small amount of other copolymerizable monomers, for example, structural units such as 1-butene, pentene, hexane, butadiene, isoprene, and methyl vinyl ether. The ratio of structural units composed of such other copolymerizable monomers in this case is preferably 30 wt. % or less, more preferably 10 wt. % or less, based on the weight of the vinyl aromatic polymer block.

Examples of conjugated diene compounds used for forming the conjugated diene polymer block constituting, together with the vinyl aromatic polymer block, the block copolymer (I) include isoprene, butadiene, hexadiene, 2,3-dimethyl-1,3-butadiene, and 1,3-pentadiene. The conjugated diene polymer block may be composed of one type of those conjugated diene compounds or of two or more types thereof. When the conjugated diene polymer block comprises structural units derived from conjugated diene compounds of two or more types, the bonding state thereof may be of a random, taper, and partial block type, or combination of two or more thereof.

Among them, the conjugated diene polymer block is preferably a polyisoprene block composed of monomer units based on isoprene units or hydrogenated polyisoprene block in which some or all of the unsaturated bonds are hydrogenated, a polybutadiene block composed of monomer units based on butadiene units or hydrogenated polybutadiene block in which some or all of the unsaturated bonds are hydrogenated, or an isoprene/butadiene copolymer block composed of monomer units based on isoprene units and butadiene units or hydrogenated isoprene/butadiene copolymer block in which some or all of the unsaturated bonds are hydrogenated.

In the aforesaid polyisoprene block that can form a constituent block of the conjugated diene polymer block, prior to hydrogenation thereof, the units derived from isoprene are composed of at least one group selected from 2-methyl-2-butene-1,4-diyl group [—$CH_2$—$C(CH_3)$=$CH$—$CH_2$—; 1,4-bond isoprene unit], isopropenyl ethylene group [—$CH(C(CH3)$=$CH_2)$—$CH_2$—; 3,4-bond isoprene unit], and 1-methyl-1-vinyl ethylene group [—$C(CH_3)(CH$=$CH_2)$—$CH_2$—; 1,2-bond isoprene unit]. No specific limitation is placed on the content ratio of each unit.

It is preferred that in the aforesaid polybutadiene block that can form a constituent block of the conjugated diene polymer block, prior to hydrogenation thereof, 2-butene-1,4-diyl groups (—$CH_2$—$CH$=$CH$—$CH_2$—; 1,4-bond butadiene unit) take 70-20 mol %, especially 65-40 mol % of the butadiene unit, and vinyl ethylene groups [—$CH(CH$=$CH_2)$—$CH_2$—; 1,2-bond butadiene unit] take 30-80 mol %, especially 35-60 mol %].

It is preferred that in the aforesaid isoprene/butadiene copolymer block that can form a constituent block of the conjugated diene polymer block, prior to hydrogenation thereof, the unit derived from isoprene is composed of at least one group selected from 2-methyl-2-butene-1,4-diyl group, isopropenyl ethylene group, and 1-methyl-1-vinyl ethylene group, and the unit derived from butadiene is composed of 2-butene-1,4-diyl group and/or vinyl ethylene group; no specific limitation is placed on the content ratio of each unit. In the isoprene/butadiene copolymer block, the arrangement of isoprene units and butadiene units may be of a random, block, or taper block type. Furthermore, in the isoprene/butadiene copolymer block, the molar ratio of isoprene units and butadiene units is 1:9-9:1, preferably, 3:7-7:3.

From the standpoint of obtaining good heat resistance and weather resistance of the thermoplastic polymer composition, it is preferred that part or all of the unsaturated double bonds in the conjugated diene polymer block in the block copolymer (I) mainly composed of vinyl aromatic polymer blocks and conjugated diene polymer blocks is hydrogenated (sometimes referred to hereinbelow as "hydrogenation"). The hydrogenation ratio of the conjugated diene polymer block in this case is preferably 50 mol % or higher, more preferably 60 mol % or higher, even more preferably 80 mol % or higher.

No specific limitation is placed on the molecular weight of the vinyl aromatic polymer block and the conjugated diene polymer block in the block copolymer (I). However, from the standpoint of mechanical properties and moldability of the thermoplastic polymer composition, it is preferred that the number-average molecular weight of the vinyl aromatic polymer block is within a range of 1,000 to 100,000 and the number-average molecular weight of the conjugated diene polymer block is within a range of 10,000 to 500,000 in a state prior to hydrogenation. Furthermore, the number-average molecular weight as referred to in the present specification is a value found from a standard polystyrene calibration curve by gel permeation chromatography (GPC).

The block copolymer (I) can be manufactured by an ion polymerization method such as anion polymerization or cation polymerization, a single site polymerization method, a radical polymerization method, or the like. For example, when an anion polymerization method is used, the block copolymer can be manufactured by conducting successive polymerization of a vinyl aromatic compound and a conjugated diene compound in an inactive organic solvent such as n-hexane or cyclohexane in the presence of an anion polymerization initiator such as an alkyllithium compound to manufacture a block copolymer (preferably a triblock copolymer) having the desired molecular structure and number-average molecular weight and then terminating the polymerization by adding an active hydrogen compound such as an alcohol, a carboxylic acid, and water.

As described hereinabove, the polymer mixture (B) comprises a block copolymer (I) that has been modified at a modification ratio of 0.05 wt. % or more, so that it has a functional group capable of reacting with the ethylene-vinyl alcohol copolymer (A). Such a modified block copolymer (I) has an effect of improving flexibility, while producing an effect of improving barrier properties of the thermoplastic polymer composition with respect to gases and organic liquids and improving mutual compatibility of the ethylene-vinyl alcohol copolymer (A), polymer mixture (B), and polyolefin resin (C).

Furthermore, the vinyl aromatic polymer block and conjugated diene polymer block constituting the modified block copolymer (I) can be formed from a variety of vinyl aromatic polymer blocks and conjugated diene polymer blocks that were described hereinabove with respect to the non-modified block copolymer (I). However, from the standpoint of obtaining good mutual compatibility, it is especially preferred that the vinyl aromatic polymer block and conjugated diene polymer block constituting the block polymer is formed from the blocks identical to those of the non-modified block copolymer (I).

As described hereinabove, the preferred examples of functional groups which are the components of the modified block copolymer (I) and can react with the ethylene-vinyl alcohol copolymer (A) include functional groups derived from α,β-unsaturated carboxylic acids and/or derivatives thereof. Specific examples of α,β-unsaturated carboxylic acids and/or derivatives thereof include α,β-unsaturated monocarboxylic acids such as acrylic acid and. methacrylic acid, α,β-unsaturated dicarboxylic acids such as maleic acid, succinic acid, itaconic acid, and phthalic acid, α,β-unsaturated monocarboxylic acid esters such as glycidyl acrylate, glycidyl methacrylate, hydroxyethyl acrylate, and hydroxyethyl methacrylate, α,β-unsaturated dicarboxylic acid anhydrides such as maleic anhydride, succinic anhydride, itaconic anhydride, and phthalic anhydride. Among them, especially preferred are α,β-unsaturated dicarboxylic acids anhydrides such as maleic anhydride, succinic anhydride, itaconic anhydride, and phthalic anhydride, in particular maleic anhydride.

No specific limitation is placed on the method for obtaining a modified block copolymer (I) by introducing an α,β-unsaturated dicarboxylic acid anhydride into a non-modified block copolymer (I). For example, a method for radical addition to a block copolymer composed of a vinyl aromatic polymer block and a conjugated diene polymer block can be used.

The polymer mixture (B) comprises a rubber softener (II) as a component for flexibilizing or plasticizing the conjugated diene polymer block of block copolymer (I). Softening agents for rubbers that have been typically blended with rubbers can be used without specific limitations as the rubber softener (II). Among them, paraffin oils are preferably used. Oils that are used as process oils are typically a mixture of a component having an aromatic ring such as a benzene ring or a naphthene ring and a paraffin component (linear hydrocarbon), and oils in which the carbon atoms constituting the paraffin chain assume at least 50 wt. % of the total number of carbon atoms in the oil are called "paraffin oils". Paraffin oils with a content ratio of the component having an aromatic ring is 5 wt. % or less is preferably used as the rubber softener (II) employed in accordance with the present invention.

The kinematic viscosity of paraffin oils at a temperature of 40° C. is preferably $20\times10^{-6}$ to $800\times10^{-6}$ m$^2$/sec, more preferably $50\times10^{-6}$ to $600\times10^{-6}$ m$^2$/sec. Furthermore, the pour point is preferably from −40° C. to 0° C., more preferably from −30° C. to 0° C. The ignition point is preferably 200 to 400° C., more preferably 250 to 350° C.

Examples of the polyolefin resin (C) suitable for the thermoplastic polymer composition in accordance with the present invention include ethylene polymers and propylene polymers which can be used individually or in combinations of two or more thereof.

Specific examples of ethylene polymers that are preferably used as the polyolefin resin (C) include ethylene homopolymers such as high-density polyethylene, medium-density polyethylene, and low-density polyethylene, copolymers with α-olefins comprising 2 to 10 carbon atoms in the molecule, such as propylene, 1-butene, 1-hexene, 1-heptene, 1-octene, and 4-methyl-1-pentene, and ethylene polymers comprising an α,β-unsaturated carboxylic acid and/or a derivative thereof. From the standpoint of barrier properties with respect to gases and organic liquids, ethylene homopolymers are preferred, and in terms of increasing mutual compatibility with the ethylene-vinyl alcohol copolymer (A), ethylene polymers comprising an α,β-unsaturated carboxylic acid and/or a derivative thereof are preferably used.

Specific examples of propylene polymers that are preferably used as the polyolefin resin (C) include propylene homopolymers, ethylene-propylene random copolymers, ethylene-propylene block copolymers, copolymers with α-olefins comprising 3 to 10 carbon atoms in the molecule, such as 1-butene, 1-hexene, 1-heptene, 1-octene, and 4-methyl-1-pentene, and propylene polymers comprising an α,β-unsaturated carboxylic acid and/or a derivative thereof. From the standpoint of barrier properties with respect to gases and organic liquids, ethylene homopolymers are preferred, and in terms of increasing mutual compatibility with the ethylene-vinyl alcohol copolymer, propylene polymers comprising an α,β-unsaturated carboxylic acid and/or a derivative thereof are preferably used.

Among the aforesaid compounds, propylene polymers are preferably used as the polyolefin resin (C). This is because, propylene polymers have excellent mutual compatibility with the block copolymer (I) mainly composed of a vinyl aromatic polymer block and an optionally hydrogenated conjugated diene polymer block. Examples of especially preferred propylene polymers include propylene homopolymers and propylene polymers comprising an α,β-unsaturated carboxylic acid and/or a derivative thereof.

The polyolefin resin can be manufactured, for example, by coordination polymerization using a Ziegler-Natta catalyst or a metallocene catalyst, radical polymerization, or anion polymerization.

Examples of α,β-unsaturated carboxylic acids and/or derivatives thereof in the olefin polymers comprising an α,β-unsaturated carboxylic acid and/or a derivative thereof include α,β-unsaturated monocarboxylic acids such as acrylic acid and methacrylic acid, α,β-unsaturated dicarboxylic acids such as maleic acid, succinic acid, itaconic acid, and phthalic acid, α,β-unsaturated monocarboxylic acid esters such as glycidyl acrylate, glycidyl methacrylate, hydroxyethyl acrylate, and hydroxyethyl methacrylate, and α,β-unsaturated dicarboxylic acids anhydrides such as maleic anhydride, succinic anhydride, itaconic anhydride, and phthalic anhydride. The especially preferred among them are α,β-unsaturated dicarboxylic acids anhydrides such as maleic anhydride, succinic anhydride, itaconic anhydride, and phthalic anhydride, in particular maleic anhydride.

The following three conditions have to be satisfied in the thermoplastic polymer composition in accordance with the present invention:

the ratio of [A]:[B] is in the range of 10:90 to 50:50 (preferably 15:85 to 40:60), the ratio of [I]:[II] is in the range of 30:70 to 90:10 (preferably 40:60 to 85:15), the ratio of ([A]+[B]):[C] is in the range of 100:0 to 100:30 (preferably 100:0 to 100:20), when the blending amount of component (A) is denoted by [A] parts by weight, the blending amount of component (B) is denoted by [B] parts by weight, the blending amount of component (C) is denoted by [C] parts by weight, the blending amount of block copolymer (I) in component (B) is denoted by [I] parts by weight, and the blending amount of rubber softener (II) is denoted by [II] parts by weight.

It is undesirable that the ratio of [A] to a total of [A] and [B] is less than 10 wt. %, because barrier properties of the thermoplastic polymer composition with respect to gases and organic liquids in this case are insufficient, and it is undesirable that this ratio is above 50 wt. % because flexibility in this case tends to decrease.

It is undesirable that the ratio of [I] to a total of [I] and [II] is less than 30 wt. % because rubber elasticity and flexibility of the thermoplastic polymer composition in this case are decreased and the ability to retain the rubber softener (II) is degraded, and it is undesirable that this ratio is above 90 wt. % because the balance of barrier properties with respect to gases and organic liquids and mechanical properties in this case tends to degrade.

It is undesirable that the blending amount of [C] in a total of 100 parts by weight of [A] and [B] is above 30 parts by weight because flexibility of the thermoplastic polymer composition in this case tends to decrease. Furthermore, when the thermoplastic polymer composition is used in a laminate with a layer composed of a polyolefin resin (C), the blending amount of [C] in a total of 100 parts by weight of [A] and [B] is preferably 5 parts by weight or more, to obtain excellent adhesive properties.

Further, the thermoplastic polymer composition in accordance with the present invention has an ISO type A hardness of not less than 30 and not higher than 90, preferably not less than 40 and not higher than 80. It is undesirable that the ISO type A hardness is less than 30, because the rubber softener can easily bleed out, and it is undesirable that the hardness is above 90, because rubber elasticity in this case tends to decrease. The ISO type A hardness is herein defined by ISO 48 (JIS K6253).

Furthermore, the thermoplastic polymer composition in accordance with the present invention has an oxygen permeation coefficient of 20,000 mL·20 μM/M$^2$·day·atm or less, preferably 15,000 mL·20 μm/m$^2$·day·atm or less. It is undesirable that the oxygen permeation coefficient is more than 20,000 mL·20 μm/m$^2$·day·atm, because in this case barrier properties with respect to gases and organic liquids tend to degrade. Here, the oxygen permeation coefficient is defined as the amount of permeated oxygen [mL·20 μm/m$^2$·day·atm] that was measured at a temperature of 35° C. and a humidity of 0% RH to.

No specific limitation is placed on the method for the manufacture of the thermoplastic polymer composition in accordance with the present invention, and any method may be used for this purpose, provided that the ethylene-vinyl alcohol copolymer (A), polymer mixture (B), and polyolefin resin (C) can be mixed uniformly. Usually, the thermoplastic polymer composition can be manufactured by melt kneading the aforesaid five or four components, if necessary, with other components. In this process, for example, a single-screw extruder, a twin-screw extruder, a kneader, and a Banbury mixer can be used, and the thermoplastic polymer composition in accordance with the present invention can be obtained by melt kneading for about 30 sec to 10 min at a temperature within a range of 160-280° C.

An even better balance of barrier properties and flexibility can be obtained when the thermoplastic polymer composition thus obtained has a structure in which the ethylene-vinyl alcohol copolymer (A) is dispersed in layers with a diameter of 0.1 μm to 200 μm in a matrix comprising of polymer mixture (B) and polyolefin resin (C). In this case, in the particles of the ethylene-vinyl alcohol copolymer (A) dispersed in layers, the ratio L/D (L is a long diameter of the particles and D is a short diameter) is preferably 5 or higher, more preferably 10 or higher.

In addition to the above-described components, thermoplastic polymer composition in accordance with the present invention may contain other polymers, within a range in which the effect of the present invention is substantially not degraded. Examples of other polymers that can be blended include polyphenylene ether resins, polyamide resins such as polyamide 6, polyamide 6-6, polyamide 6-10, polyamide 11, polyamide 12, polyamide 6-12, polyhexamethylenediamine terephthalamide, polyhexamethylenediamine isophthalamide, polynonamethylenediamine terephtalamide, and polyamide comprising xylene group, polyester resins such as polyethylene terephthalate and polybutylene terephthalate, acrylic resins such as polymethyl acrylate and polymethyl methacrylate, polyoxymethylene resins such as polyoxymethylene homopolymer and polyoxymethylene copolymers, styrene resins such as homopolystyrene acrylonitrile-styrene resin and acrylonitrile-butadiene-styrene resin, polycarbonate resins, natural rubbers, synthetic isoprene rubbers, liquid polyisoprene rubbers and hydrogenation products thereof, chloroprene rubber, acrylic rubber, butyl rubber, acrylonitrile-butadiene rubber, epichlorohydrin rubber, silicone rubber, fluorine-containing rubber, urethane rubber, polyurethane elastomers, polyamide elastomers, polystyrene elastomers, and soft vinyl chloride resins.

Further, if necessary, the thermoplastic polymer composition in accordance with the present invention can contain an inorganic filler or a colorant such as a dye or pigment for the purpose of reinforcement, weight increase, coloration or the like. Examples of suitable inorganic fillers and pigments include calcium carbonate, talc, clay, synthetic silicon, titanium oxide, carbon black, barium sulfate, and the like. The blended amount of the inorganic filler or pigment is preferably selected within a range in which the barrier properties of the thermoplastic polymer composition with respect to gases, organic liquids, and the like are not degraded. In general, it is preferred that the blended amount of the inorganic filler or a colorant is 50 parts by weight or less per 100 parts by weight of a total of the ethylene-vinyl alcohol copolymer (A), polymer mixture (B), and polyolefin resin (C).

Furthermore, in addition to the above-described components, the thermoplastic polymer composition in accordance with the present invention, if necessary, may contains at least one of other components such as a crosslinking agent, a crosslinking enhancer, a lubricant, a photostabilizer, a flame retarding agent, an antistatic agent, a silicone oil, a blocking preventing agent, a UV absorber, an antioxidant, a parting agent, a foaming agent, and a perfume.

Because the thermoplastic polymer composition in accordance with the present invention has thermoplastic properties, it can be molded by using the usual molding process and molding apparatus that have been used with respect to the usual thermoplastic polymers. Any process such as injection molding, extrusion molding, compression molding, blow molding, calender molding, or vacuum molding can be employed as the molding process. Examples of moldings composed of the thermoplastic polymer composition in accordance with the present invention and manufactured by the aforesaid methods include moldings of a variety of types and shapes, such as pipes, sheets, films, disks, rings, bags, bottles, strings, fibers, as well as laminated structures or composite structures comprising other materials. Employing laminated structures comprising other materials makes it possible to impart the molding with properties inherent to those other materials, such as moisture resistance and mechanical properties.

In a multilayer structure composed of at least one layer comprising the thermoplastic polymer composition in accordance with the present invention and at least one layer comprising other materials, an appropriate other material may be selected according to the required properties and predicted application. Examples of other materials include thermoplastic polymers such as polyolefins (for example, high-density polyethylene, medium-density polyethylene, low-density polyethylene, linear low-density polyethylene, ethylene-propylene copolymer, polypropylene, and the like), ionomers, ethylene-vinyl acetate copolymer (EVA), ethylene-vinyl alcohol copolymer (EVOH), ethylene-acrylic acid ester copolymer (EEA), polystyrene (PS), vinyl chloride resin (PVC), vinylidene chloride resin (PVDC).

Among the multilayer structures, the preferred embodiment is represented by a multilayer structure comprising a layer composed of a thermoplastic polymer composition containing a polyolefin resin (C) and a layer composed of a polyolefin resin (C). This is because such a thermoplastic polymer composition has excellent adhesion to polyolefin resins (C). A substance identical to that used as the polyolefin resin (C) constituting the aforesaid thermoplastic polymer composition can be used as the polyolefin resin (C), but among them propylene polymers, especially propylene homopolymers are preferably used. Furthermore, in the aforesaid multilayer structure, adhesive bonding can be carried out without introducing an adhesive agent layer between the layer composed of the thermoplastic polymer composition in accordance with the present invention and the base layer composed of a polyolefin resin. Therefore, in the configuration of the preferred embodiment, the layer composed of the aforesaid thermoplastic polymer composition and the layer composed of the polyolefin resin (C) are directly bonded to each other.

Furthermore, it is also possible to introduce an adhesive agent layer between the layer composed of the aforesaid thermoplastic polymer composition and the layer composed of another material. Introducing an adhesive agent layer makes it possible to join and integrate the layer of the thermoplastic polymer composition in accordance with the present invention and the layer composed of another material even stronger. Examples of adhesive agents that can be used in the adhesive agent layer include diene polymers modified with an acid anhydride, polyolefins modified with an acid anhydride, and mixtures of high-molecular polyols (for example, polyester polyols obtained by polycondensation of a glycol compound such as ethylene glycol and propylene glycol and a dibasic acid such as adipic acid, and partially saponified copolymers of vinyl acetate and vinyl chloride) and polyisocyanate compounds (for example, reaction products (molar ratio 1:2) of glycol compounds such as 1,6-hexamethylene glycol and diisocyanate compounds such as 2,4-tolylene diisocyanate, and reaction products (molar ratio 1:3) of tolyol compounds such as trimethylol propane and diisocyanate compounds such as 2,4-tolylene diisocyanate). In order to mold a laminated structure, a well-known method such as co-extrusion, co-injection, or injection coating can be used.

The molding products composed of the thermoplastic polymer composition in accordance with the present invention combine excellent flexibility with excellent barrier properties with respect to most gases and organic liquids. Therefore, they are suitable for daily products, packaging materials, machinery parts, lids for medicine containers, and the like. Examples of applications in which the advantages of the thermoplastic polymer composition in accordance with the present invention are demonstrated especially effectively include packaging materials for food, containers, and packing materials for containers. In the molded products supplied for those application, such a thermoplastic polymer composition may form at least one layer, and the products may be appropriately selected from those with a single-layer structure composed of such a thermoplastic polymer composition and those with a multilayer structure comprising at least one layer of such a thermoplastic polymer composition and at least one layer of another material. When the other material is a polyolefin resin, the two can be strongly bonded even without using an adhesive agent. Because the aforesaid packaging materials for food, containers, and packing materials for containers can prevent the permeation of oxygen gas present in the atmosphere and the permeation of volatile components of the contents, the contents can be preserved for a long time. Multilayer structures composed of a layer of the thermoplastic polymer composition in accordance with the present invention and a layer composed of a polyolefin resin are especially suitable for packing materials for containers. Furthermore, when the molded products composed of the thermoplastic polymer composition in accordance with the present invention are disposed of, they can be melted and reused.

EXAMPLES

The present invention will be described hereinbelow in greater detail based on examples thereof. The present invention is, however, not limited to those examples. Furthermore, molded products (test samples) were fabricated in the below-described manner by using the pellets of the thermoplastic polymer compositions obtained in the below-described examples and comparative examples, and physical properties of the molded products, that is, oxygen permeation coefficient, hardness, and peel strength of laminated structures were measured in the manner as follows.

(a) Measurement of Oxygen Permeation Coefficient

Pellets of the thermoplastic polymer compositions manufactured in the below-described examples and comparative examples were compression molded under heating with a compression molding apparatus to produce film-like test samples with a thickness of 100 μm, and those test samples were used to measure the oxygen permeation coefficient [mL·20 μm/m$^2$ ·day·atm]. Measurements of oxygen permeation coefficient were conducted with a gas permeation rate measurement apparatus (trade name GTR-10, manufactured by Yanagimoto Manufacturing Co., Ltd.,) at a temperature of 35° C. and a humidity of 0% RH.

(b) Measurement of Hardness

Pellets of the thermoplastic polymer compositions manufactured in the below-described examples and comparative examples were compression molded under heating with a compression molding apparatus to produce sheet-like test samples with a thickness of 2 mm, and those test samples were used to measure the ISO type A hardness according to ISO-48.

(c) Measurement of Peel Strength

A flat sheet of polypropylene (trade name Grand Polypro J106W, manufactured by Mitsui-Sumitomo Polyolefin Co., Ltd.) with a thickness of 1 mm was molded by injection molding in an injection molding apparatus (80-ton injection molding apparatus IS-80, manufactured by Nissei Plastic Industrial Co., Ltd.) under the following conditions: cylinder temperature 220° C. and mold temperature 40° C. The flat sheet was placed into a mold for a flat sheet (dimensions: length×width×thickness=200 mm×200 mm×2 mm), thermoplastic resin composition pellets produced as described in section (1) hereinabove were employed, and a layer of the thermoplastic resin composition was laminated on one surface of the resin sheet by using an injection molding apparatus (80-ton injection molding apparatus IS-80, manufactured by Nissei Plastic Industrial Co., Ltd.) under the following conditions: cylinder temperature 200° C. and mold temperature 40° C. to produce a laminated structure (dimensions:length×width×thickness=200 mm×200 mm×2 mm). A test sample (dimensions: length×width×thickness=150 mm×25 mm×2 mm) for peel strength measurement was cut out from the laminated structure thus obtained, and the peel strength was measured according to a "180-Degree Peel Test" described in JIS-K6854 by using the test sample.

Further, the following ethylene-vinyl alcohol copolymer (A), polymer mixture (B) (block copolymer (I), rubber softener (II), and polyolefin resin (C) were used in the below-described examples and comparative examples.

Among the block copolymers (I), the block copolymer (I-1) and the block copolymer (I-2) are the block copolymers that were not modified so as to comprise a function group that can react with the ethylene-vinyl alcohol copolymer (A), whereas the block copolymer (I-3) and the block copolymer (I-4) are the block copolymers that were modified so as to comprise a function group that can react with the ethylene-vinyl alcohol copolymer (A).

[Ethylene-vinyl alcohol copolymer (A)]

Manufactured by Kuraray Co., Ltd., trade name Eval EP-G110:

Ethylene content ratio 47 mol %, melt flow rate 14 g/10 min (190° C., load 2.16 kg), melting point 160° C.

[Block copolymer (I-1)]

Manufactured by Kuraray Co., Ltd., trade name Septon 4055:

[Block copolymer (I-2)]

A triblock copolymer composed of polystyrene block-hydrogenated isoprene/butadiene copolymer block-polystyrene block.

Styrene unit content ratio 30 wt. %, number-average molecular weight 200,000.

[Block copolymer (I-3)]

A triblock copolymer composed of polystyrene block-hydrogenated polybutadiene block-polystyrene block and modified with maleic anhydride.

Styrene unit content ratio 30 wt. %, number-average molecular weight 100,000, acid value 5 mg CH$_3$ONa/g.

[Block copolymer (I-4)]

A triblock copolymer composed of polystyrene block-hydrogenated polybutadiene block-polystyrene block and modified with maleic anhydride.

Styrene unit content ratio 30 wt. %, number-average molecular weight 100,000, acid value 2 mg CH$_3$ONa/g.

[Rubber softener (II)]

Trade name PW-3080, manufactured by Idemitsu Kosan Co., Ltd.:

Paraffin oil, kinematic viscosity 381.6 ×10$^{-6}$ m$^2$/s (40° C.), pour point −15° C.

[Polyolefin resin (C-1)]

Trade name Grand Polypro J106W, manufactured by Mitsui-Sumitomo Polyolefin Co., Ltd.:

Homopolypropylene, melt flow rate 15 g/10 min (230° C., load 2.16 kg).

[Polyolefin resin (C-2)]

Trade name Admer QF551, manufactured by Mitsui Chemicals Co., Ltd.:

Polypropylene modified with maleic anhydride, melt flow rate 5.7 g/10 min (230° C., load 2.16 kg), melting point 135° C.

EXAMPLES 1 THROUGH 9

The above-described ethylene-vinyl alcohol copolymer (A), polymer mixture (B) (block copolymer (I), rubber softener(II)), and if necessary the polyolefin resin (C) were premixed at the ratios shown in Table 1 hereinbelow, and the mixtures were supplied to a twin-screw extruder (trade name ZSK-25WLE, manufactured by Krupp Werner & Pfleiderer Co.), melt kneaded at a cylinder temperature of 200° C. and a screw rotation speed of 350 rpm, extruded and cut to obtain pellets of respective thermoplastic polymer compositions.

Pressed films and molded products (test samples) were produced by the above-described method by using the pellets of the thermoplastic polymer compositions thus obtained and the oxygen permeation coefficient and peel strength were measured by the above-described methods. The results are presented in Table 1 below.

ZSK-25WLE, manufactured by Krupp Werner & Pfleiderer Co.), melt kneaded at a cylinder temperature of 200° C. and a screw rotation speed of 350 rpm, extruded and cut to obtain pellets of respective thermoplastic polymer compositions.

TABLE 1

| Components | Examples (parts by weight) | | | | | | | | |
|---|---|---|---|---|---|---|---|---|---|
| | 1 | 2 | 3 | 4 | 5 | 6 | 7 | 8 | 9 |
| (A) Ethylene-vinyl alcohol copolymer | 30 | 40 | 40 | 30 | 20 | 30 | 30 | 30 | 15 |
| (B) Block copolymer (I-1) | 27 | 20 | 20 | — | — | — | — | — | — |
| Block copolymer (I-2) | — | — | — | 20 | 28 | 20 | 20 | 20 | 30 |
| Block copolymer (I-3) | 30 | 30 | 20 | — | — | — | — | — | — |
| Block copolymer (I-4) | — | — | — | 30 | 10 | 30 | 30 | 30 | 10 |
| Rubber softener (II) | 13 | 10 | 20 | 20 | 42 | 20 | 20 | 20 | 45 |
| (C) Polyolefin resin (C-1) | — | — | — | — | — | 5 | 15 | — | — |
| Polyolefin resin (C-2) | — | — | — | — | — | — | — | 15 | 10 |
| Oxygen permeation coefficient [mL · 20 μm/m² · day · atm] | 8500 | 3900 | 6100 | 5000 | 4000 | 1300 | 3000 | 3000 | 15000 |
| ISO type A hardness | 73 | 90 | 86 | 80 | 54 | 83 | 86 | 87 | 59 |
| Adhesive strength [N/25 mm] | — | — | — | — | — | 19 | 28 | 63 | 60 |

COMPARATIVE EXAMPLES 1 THROUGH 6

The above-described ethylene-vinyl alcohol copolymer (A), polymer mixture (B) (block copolymer (I), rubber softener(II)), and if necessary the polyolefin resin (C) were premixed at the ratios shown in Table 2 hereinbelow, and the mixtures were supplied to a twin-screw extruder (trade name Pressed films and molded products (test samples) were produced by the above-described method by using the pellets of the thermoplastic polymer compositions thus obtained and the oxygen permeation coefficient and peel strength were measured by the above-described methods. The results are presented in Table 2 below.

TABLE 2

| Components | Comparative Examples (parts by weight) | | | | | |
|---|---|---|---|---|---|---|
| | 1 | 2 | 3 | 4 | 5 | 6 |
| (A) Ethylene - vinyl alcohol copolymer | 60 | 5 | 30 | 20 | 30 | 30 |
| (B) Block copolymer (I-1) | 20 | 35 | 70 | — | — | 47 |
| Block copolymer (I-2) | — | — | — | 16 | 20 | — |
| Block copolymer (I-3) | 10 | 30 | — | — | — | — |
| Block copolymer (I-4) | — | — | — | 4 | 30 | — |
| Rubber softener (II) | 10 | 30 | — | 60 | 20 | 23 |
| (C) Polyolefin resin (C-1) | — | — | — | — | — | — |
| Polyolefin resin (C-2) | — | — | — | — | 40 | — |
| Oxygen permeation coefficient [mL · 20 μm/m² · day · atm] | 350 | 80000 | 56000 | 130000 | 3000 | 72000 |
| ISO type A hardness | 95 | 57 | 74 | 25 | 95 | 65 |
| Adhesive strength [N/25 mm] | — | — | — | — | 9 | — |

When the thermoplastic polymer compositions of Examples 1 through 9 that were manufactured by using the above-described ethylene-vinyl alcohol copolymer (A) and polymer mixture (B) (block copolymer (I), rubber softener (II)) were employed, good gas barrier properties represented by an oxygen permeation coefficient of about 1300 through about 15000 mL·20 μm/m² ·day·atm and flexibility represented by an ISO type A hardness of 56 through 90 were obtained. Furthermore, in Examples 6 through 9 in which the polypropylene resin (C) was admixed, the peel strength with respect to polypropylene was 19-63 N/25 mm.

Further, the results shown in Table 2 demonstrate that the thermoplastic polymer composition of Comparative Example 1 in which the ratio of the ethylene-vinyl alcohol copolymer (A) and the polymer mixture (B) (block copolymer (I) and rubber softener (II)) is 60:40 has excellent gas barrier properties, but poor flexibility, and the thermoplastic polymer composition of Comparative Example 2 in which the ratio is 5:95 has poor gas barrier properties. Furthermore, it is clear that the thermoplastic polymer composition of Comparative Examples 3 and 4 in which the ratio of the block copolymer (I) and rubber softener (II) in the polymer mixture (B) is shifted from the range of 30:70 through 90:10 has poor gas barrier properties. It is also clear that the thermoplastic polymer composition of Comparative Example 5 in which the ratio of the polyolefin resin (C) to the sum of the ethylene-vinyl alcohol copolymer (A) and the polymer mixture (B) is 100:40 has excellent gas barrier properties, but poor flexibility. It is also clear that the thermoplastic polymer composition of Comparative Example 6 in which the modification ratio of the block copolymer (I) is 0 wt. % has poor gas barrier properties.

The entire disclosures of the specifications, claims and abstracts of Japanese Patent Applications Nos. 2002-360377 and 2003-272372, filed on Dec. 12, 2002, and Jul. 9, 2003, respectively, are hereby incorporated by reference.

What is claimed is:

1. A thermoplastic polymer composition comprising the following components (A), (B), and (C):
    ethylene-vinyl alcohol copolymer (A);
    a polymer mixture (B) composed of a block copolymer (I) and a rubber softener (II), wherein the block copolymer (I) comprises an unmodified block copolymer and a modified block copolymer,
    the unmodified block copolymer mainly comprises a vinyl aromatic polymer block and a hydrogenated, conjugated diene polymer block,
    the modified block copolymer is a block copolymer which may be hydrogenated, the block copolymer mainly comprising a vinyl aromatic polymer block and a conjugated diene polymer block and being obtained by radical-addition of α,β-unsaturated carboxylic acid and/or a derivative thereof to part of the unmodified block copolymer of block copolymer (I); and
    a polyolefin resin (C), wherein
    the following four conditions are satisfied:
    the ratio of [A]:[B] is in the range of 10:90 to 50:50,
    the ratio of [I]:[II] is in the range of 30:70 to 90:10,
    the ratio of ([A]+[B]):[C] is in the range of 100:0 to 100:30,
    the ratio of [the unmodified block copolymer]:[the modified block copolymer] is in the range of 90:10 to 20:80, when the blending amount of component (A) in the thermoplastic polymer composition is denoted by [A] parts by weight, the blending amount of component (B) is denoted by [B] parts by weight, the blending amount of component (C) is denoted by [C] parts by weight, the blending amount of block copolymer (I) in component (B) is denoted by [I] parts by weight, and the blending amount of rubber softener (II) is denoted by [II] parts by weight, and the blending amount of unmodified or modified block copolymer is denoted by [the unmodified block copolymer] or [the modified block copolymer] parts by weight,
    wherein the modified block copolymer has been modified at a modification ratio of 0.05 wt. % or higher and 20 wt. % or less, so as to have a functional group capable of reacting with the ethylene-vinyl alcohol copolymer (A),
    the ISO type A hardness of the composition is not less than 30 and not higher than 90, and
    the oxygen permeation coefficient is 20,000 mL·20 μm/m²·day·atm or less, and wherein the ethylene-vinyl alcohol copolymer (A) is in the form of particles that are dispersed in layers in a matrix comprising polymer mixture (B) and polyolefin resin (C).

2. The thermoplastic polymer composition according to claim 1, wherein the polyolefin resin (C) is present and is a propylene polymer.

3. The thermoplastic polymer composition according to claim 1, wherein the polyolefin resin (C) is present and is polypropylene containing a functional group derived from an α, β-unsaturated carboxylic acid and/or a derivative thereof.

4. A molded product composed of the thermoplastic polymer composition of claim 1.

5. The molded product according to claim 4, which is a packing for a container.

6. A multilayer structure comprising a layer composed of the thermoplastic polymer composition of claim 1 and a layer composed of the polyolefin resin (C).

7. The multilayer structure according to claim 6, wherein the layer composed of said thermoplastic polymer composition and the layer composed of the polyolefin resin (C) are directly adhesively bonded to each other.

8. The multilayer structure according to claim 6 or 7, wherein the polyolefin resin (C) is a polypropylene polymer.

9. A packing for a container composed of the multilayer structure of claim 6.

10. The thermoplastic polymer composition according to claim 1, wherein the ISO type A hardness is not less than 40 and not higher than 80.

11. The thermoplastic polymer composition according to claim 1, wherein the oxygen permeation coefficient is 15,000 mL·20 μm/m²·day·atm or less.

12. The thermoplastic polymer composition according to claim 1, wherein a ratio of modified block copolymer (I) to the entire block copolymer (I) component is 25-60 wt %.

* * * * *